United States Patent [19]

Kushima et al.

[11] 4,068,936
[45] Jan. 17, 1978

[54] OPTICAL PROJECTION APPARATUS FOR IMAGE TRANSFER TYPE ELECTROPHOTOGRAPHIC COPIERS

[75] Inventors: Teizo Kushima, Osaka; Takaji Kurita, Kawachinagano; Hiroaki Mizunoe, Sakai, all of Japan

[73] Assignee: Minolta Camera Kabushiki Kaisha, Osaka, Japan

[21] Appl. No.: 753,099

[22] Filed: Dec. 21, 1976

[30] Foreign Application Priority Data

Dec. 28, 1975 Japan .............................. 50-176893[U]

[51] Int. Cl.² ........................ G03B 27/00; G03B 15/28
[52] U.S. Cl. ............................................. 355/1; 355/8
[58] Field of Search ...................... 355/1, 8; 240/1 LP

[56] References Cited

U.S. PATENT DOCUMENTS

| 3,898,678 | 8/1975 | Walworth ................. 240/1 LP X |
| 3,947,106 | 3/1976 | Hamaguchi et al. ........ 240/1 LP X |
| 3,955,888 | 5/1976 | Kakiuchi et al. .................. 355/1 |
| 3,981,575 | 9/1976 | Tanaka et al. .................... 355/1 |

Primary Examiner—Donald Griffin
Attorney, Agent, or Firm—Watson, Cole, Grindle & Watson

[57] ABSTRACT

Optical projection apparatus for an image transfer type electrophotographic copier, wherein prism-shaped reflecting members are disposed at both ends of an optical fiber type image transmitter formed by a bundle of optical fibers having graded refractive indexes, so as to refract an optical path, whereby an optical image of an original document is projected towards the side peripheral surface of a photosensitive drum, reducing the height of the optical projection apparatus and thus providing a compact copier. The optical projection apparatus is so constructed that the image transmitter formed by a bundle of optical fibers having graded refractive indexes is fixedly held between the prism-shaped reflecting members including a prism portion and a support or body portion integrally formed therewith.

4 Claims, 7 Drawing Figures

OPTICAL PROJECTION APPARATUS FOR IMAGE TRANSFER TYPE ELECTROPHOTOGRAPHIC COPIERS

BACKGROUND OF THE INVENTION

This invention relates to optical projection apparatus for an image transfer type electrophotographic copier, using an image transmitter formed by a bundle of optical fibers having graded refractive indexes.

An image transmitter formed by a bundle of optical fibers having graded refractive indexes referred to herein is an element consisting of a number of optical fibers 4 arranged in intimate contact with one another, and a material such as a resin which encloses the plurality of optical fibers. The refractive index is graded from the longitudinal axis of the optical fiber towards the peripheral portion thereof, as shown in FIG. 1. As shown in FIG. 2, if the length $l$ of the plurality of optical fibers is properly selected, then there is obtained an erect image at a ratio of 1:1 at a distance $l'$ from the bottom end of the optical fibers with the original document at a distance $l'$ from the top end of the optical fibers.

The image transmitter formed by a bundle of optical fibers 2 having graded refractive indexes is advantageously small as compared with a optical lens system of the prior art, and also does not decrease the quantity of peripheral light or the resolving-power of the optical system. Various attempts have recently been made for using an image transmitter formed by a bundle of optical fibers having graded refractive indexes in a copying machine. For example, a device as shown in FIG. 2 has been proposed, in which an original document 6, the image transmitter formed by a bundle of optical fibers 2 having graded refractive indexes and photosensitive drum 8 are disposed in vertically aligned relation to one another. That arrangement, however, requires that original document 6 and photosensitive drum 8 be spaced apart a certain distance from each other, with the result that the size of the copying machine is not reduced, because of the aforesaid intervening distance requirements.

The present invention achieves a compact copying machine size, and particularly a reduction in the height of the copying machine, by providing prism-shaped reflecting members at both ends of an image transmitter formed by a bundle of optical fibers having graded refractive indexes, so as to refract the optical path. For a better understanding of the present invention, there is shown in FIG. 3 a prior art device using an image transmitter formed by a bundle of optical fibers having graded refractive indexes as well as a prism, which is disclosed in Japanese patent application No. 48-139287 published on July 24, 1975. In this prior art device, the image transmitter formed by a bundle of optical fibers 2 having graded refractive indexes is used as an optical system for an electrofax type copying machine. Since photosensitive sheet 10 coated with a photosensitive material such as ZnO is used in an electrofax type copying machine, the optical image of original document 6 must be projected onto photosensitive sheet 10 in a manner to be developed as a real image. Accordingly, in case the image transmitter formed by a bundle of optical fibers having graded refractive indexes, which forms an erect image, is used in the electrofax type copying machine, then the optical image need be inverted once by a prism or mirror. To this end, there is provided in the device of FIG. 3 prism 12 or a mirror at the end of the image transmitter formed by a bundle of optical fibers 2 having graded refractive indexes. The image thus inverted is formed as an electrostatic latent image, conforming to the image of the original document, on photosensitive sheet 10 charged with electrostatic charges beforehand, and then subjected to development in a known developing device.

In this device, if prism 12 is formed so as to provide only that portion which is optically required, then there is required an increase in the length of the prism 12 compared with its volume, and such an elongated prism 12 is susceptible to deformation, thus causing image distortion. Such an elongated prism is also difficult to mold. Furthermore, the use of a bonding agent for fixing the prism to an image transmitter formed by a bundle of optical fibers having graded refractive indexes involves a risk of misalignment between the prism and the image transmitter due to heat incurred during the operation of the photocopier.

SUMMARY OF THE INVENTION

It is accordingly a principal object of the present invention to provide an optical projection device for an image transfer type electrophotographic copier, wherein prism-shaped reflecting members are disposed at both ends of an image transmitter formed by a bundle of optical fibers having graded refractive indexes for refracting an optical path, whereby a compact size of a transfer type electrophotographic copier, and particularly a reduction in its height, may be achieved.

It is another object of the present invention to provide an optical projection apparatus for an image transfer type electrophotographic copier, wherein a prism-shaped reflecting member has a prism portion and a support portion which are molded integrally, so that the prism-shaped reflecting member resists deformation, and the molding process for making the prism is simplified.

It is a further object of the present invention to provide an optical projection apparatus for an image transfer type electrophotographic copier, wherein an image transmitter formed by a bundle of optical fibers having graded refractive indexes is simply assembled to be held between prism-shaped reflecting members, to be fixed in place, without using any bonding agent, so that misalignment between prism-shaped reflecting members and the image transmitter due to heat incurred during operation of the copier may be avoided.

To attain these objects there is provided, according to the present invention, an optical projection apparatus for an image transfer type electrophotographic copier, wherein prism-shaped reflecting members are provided at both ends of an image transmitter formed by a bundle of optical fibers having graded refractive indexes, so as to refract an optical path, whereby an optical image of an original document may be projected towards the side peripheral surface of a photosensitive drum remote from the top portion thereof. This provides the shortest distance for the optical path of the image of the original document to be copied. Each prism-shaped reflecting member has a prism portion and a support portion which are molded integrally, thus, presenting substantially an L-shaped cross-section. Upon assembly of the optical projection apparatus, the image transmitter is held between the two prism-shaped reflecting members, thereby being rigidly positioned during the operation of the copier apparatus.

DESCRIPTION OF PREFERRED EMBODIMENTS

Figure 4:
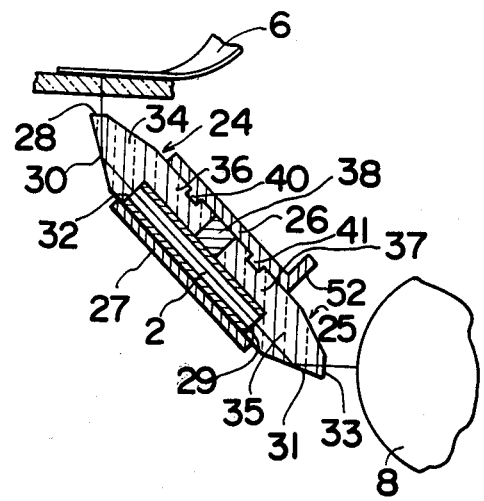
FIG. 4 is a cross-sectional view of an optical projection apparatus according to the present invention.
Figure 5:
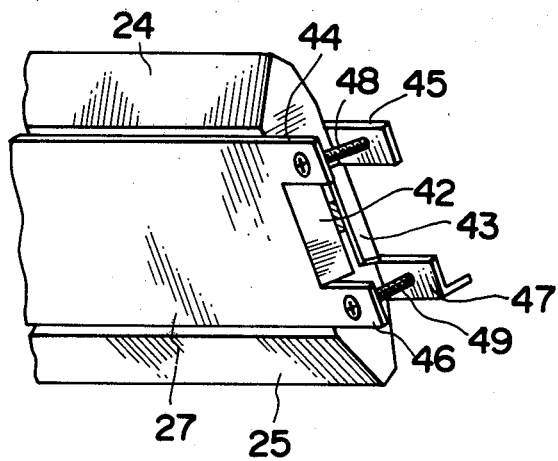
FIG. 5 is a fragmentary perspective view of the end portion of the optical projection apparatus of the present invention.

Referring to FIGS. 4 and 5, optical projection apparatus 20 of the present invention is positioned between exposure position 22, through which original document 6 passes, and photosensitive drum 8, so that an optical image of original document 6 is projected along a refracted optical path to the side peripheral surface of the photosensitive drum 8 remote from the top portion thereof.

Optical projection apparatus 20 comprises an image transmitter formed by a bundle of optical fibers 2 having graded refractive indexes, prism-shaped light reflecting member 24 located on the side of the original document, prism-shaped reflecting member 25 located on the photosensitive drum side, and two support plates 26 and 27 supporting the aforesaid members from both sides thereof, thereby fixedly holding these members therebetween. Prism-shaped reflecting members 24, 25 are made of transparent plastic, such as polymethyl methacrylate or polysthylene. Prism-shaped reflecting member 24 located on the original document side consists of prism portion 34 and support portion 36 which are molded integrally, thus presenting substantially an L-shaped cross-section. Prism portion 34 consists of light-incident face 28, light reflecting face 30 and light emitting face 32 which is maintained in contact with one end face of the image transmitter formed by a bundle of optical fibers having graded refractive indexes. Another prism-shaped light reflecting member 25 located on the side of photosensitive drum 8 is substantially the same in construction as reflecting member 24, with the exception that light incident face 29 and light emitting face 33 of the former are positionally inverted with respect to the similar elements of the latter. In FIG. 4, the image transmitter formed by a bundle of optical fibers 2 having graded refractive indexes is disposed at an angle of 45° to an original document support, and hence the prism-shaped light-reflecting members both present the same configuration. But it is obvious that, according to the inclination of the image transmitter formed by a bundle of optical fibers 2 having graded refractive indexes, prism portion 34 of one reflecting member 24 presents a different configuration from that of the other reflecting member 25. Reflecting faces 30 and 31 of both members are of the total reflection face type, but may also be of the mirror face type.

An opaque material 38 should be filled in the space defined by the facing support portions 36 and 37 of the two prism-shaped reflecting members 24 and 25, for interrupting the scattered rays. In place of the opaque filler material, opaque paint may be applied to the mating end faces of the respective support portions.

Support plate 26 has projections 40 and 41 which, in turn, are maintained in engagement with recesses provided in support portions 36 and 37 of prism-shaped reflecting members 24 and 25, thereby preventing an unwanted shifting of reflecting members 24 and 25.

As viewed in FIG. 5, respective end portions of support plates 26 and 27 are bent inwardly in their central portions 42 and 43 so as to prevent an unwanted leftward and rightward shifting of these reflecting members. The remaining end portions 44, 45 and 46, 47 of respective support plates 26 and 27 are fastened to each other by screws 48 and 49.

The optical projection apparatus 20 thus assembled is secured to the body proper of the copying machine or a scanning casing by bolting externally bent portion 52 of one support plate 26 thereto.

Figure 6:
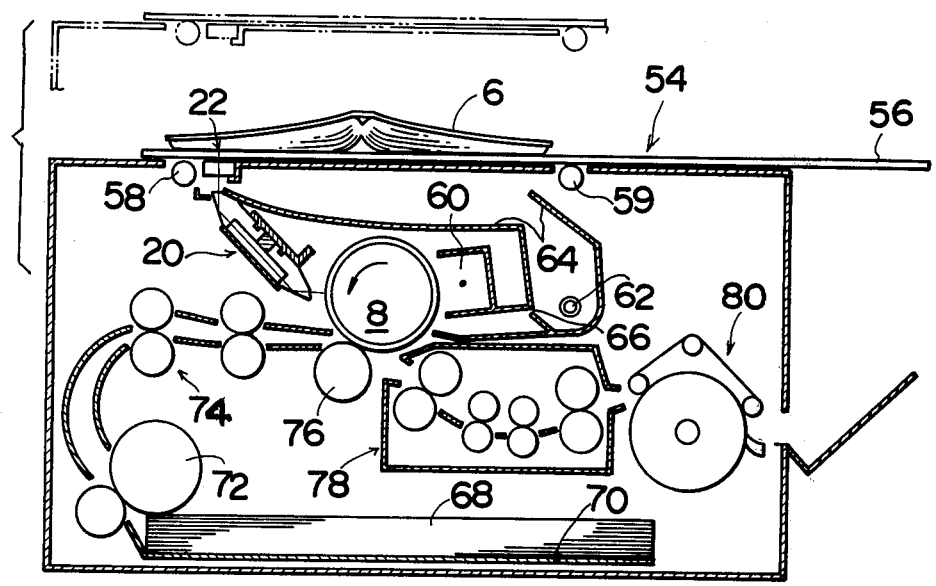
FIG. 6 is a cross-sectional view of a movable original-document-support, image transfer type, electrophotographic copying machine, to which the optical projection apparatus of the present invention is applied.

FIG. 6 shows a reciprocatingly movable document support, image-transfer type, electrophotographic copying machine, to which is applied optical projection apparatus 20 of the present invention. Original document 6 is placed on an original document support 56 and passes through exposure position 22. The travel of original document support 56 is adjusted by known means, such as rollers 58 and 59, such that the original document support may be returened to its home position after termination of the scanning. Optical projection apparatus 20 is positioned below exposure position 22, and photosensitive drum 8 is located to confront the light emitted from optical projection apparatus 20. Disposed on the right side of photosensitive drum 8 as viewed in FIG. 6 are charger 60, lamp 62, and reflecting mirror 64 for projecting light from lamp 62 to the exposure position. Light from lamp 62 is projected through opening 66 to the side peripheral surface of the photosensitive drum for erasing residual electrostatic charge on the peripheral surface thereof, after termination of the transfer step.

Disposed in the lower portion of the copying machine is stacker 70 in which a plurality of transfer sheets 68 are stacked in superposed relationship. Transfer sheet 68 is fed one-by-one from stacker 70 by transfer-sheet feed roller 72, and transported by transporting path 74 to a passage between photosensitive drum 8 and transfer roller 76. The electrostatic latent image formed on the peripheral surface of the photosensitive drum is transferred onto transfer sheet 68 by transfer roller 76. Transfer sheet 68 is then transported to developing device 78 and then to heat fixing device 80, and delivered as a copy to the exterior of the copying machine.

Figure 1:
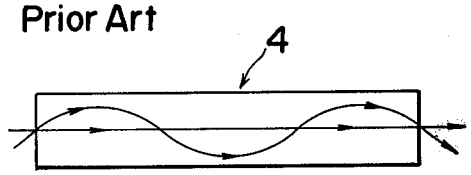
FIG. 1 represents an optical fiber in which the refractive index is graded continuously from its axis to its peripheral portion.
Figure 2:
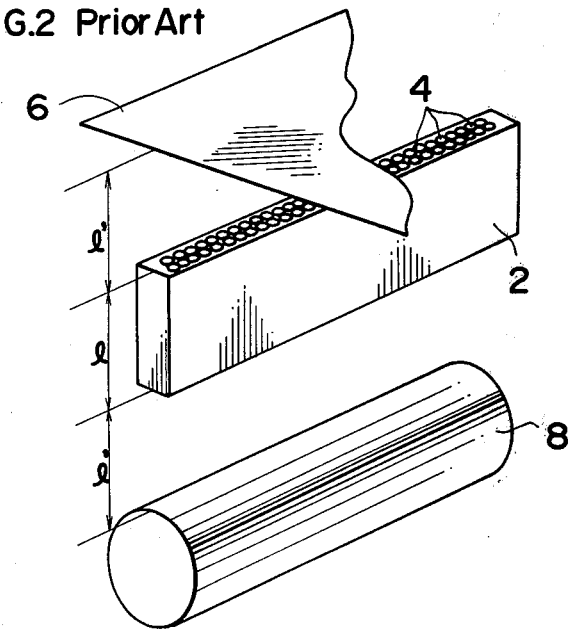
FIG. 2 is a perspective view of an image transmitter formed by a bundle of optical fibers having graded refractive indexes, which consists of a plurality of optical fibers arranged in intimate contact with one another, wherein the arrangement of the image transmitter relative to an original document and a photosensitive member in the prior art device is shown.
Figure 3:
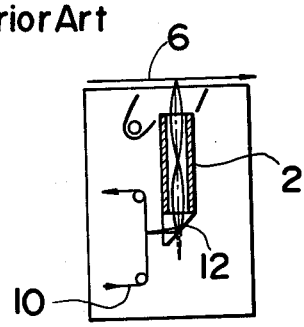
FIG. 3 is a cross-sectional view of a device of the prior art.

A compact size of the copying machine 54, particularly through a reduction in the height of the copying machine, is successfully achieved by using optical projection apparatus 20 of the present invention. If the image transmitter formed by a bundle of optical fibers 2 having graded refractive indexes were arranged in the manner shown in FIG. 2, the top surface of the copying machine would be elevated to the level shown for reference purposes by the phantom lines in FIG. 6.

Figure 7:
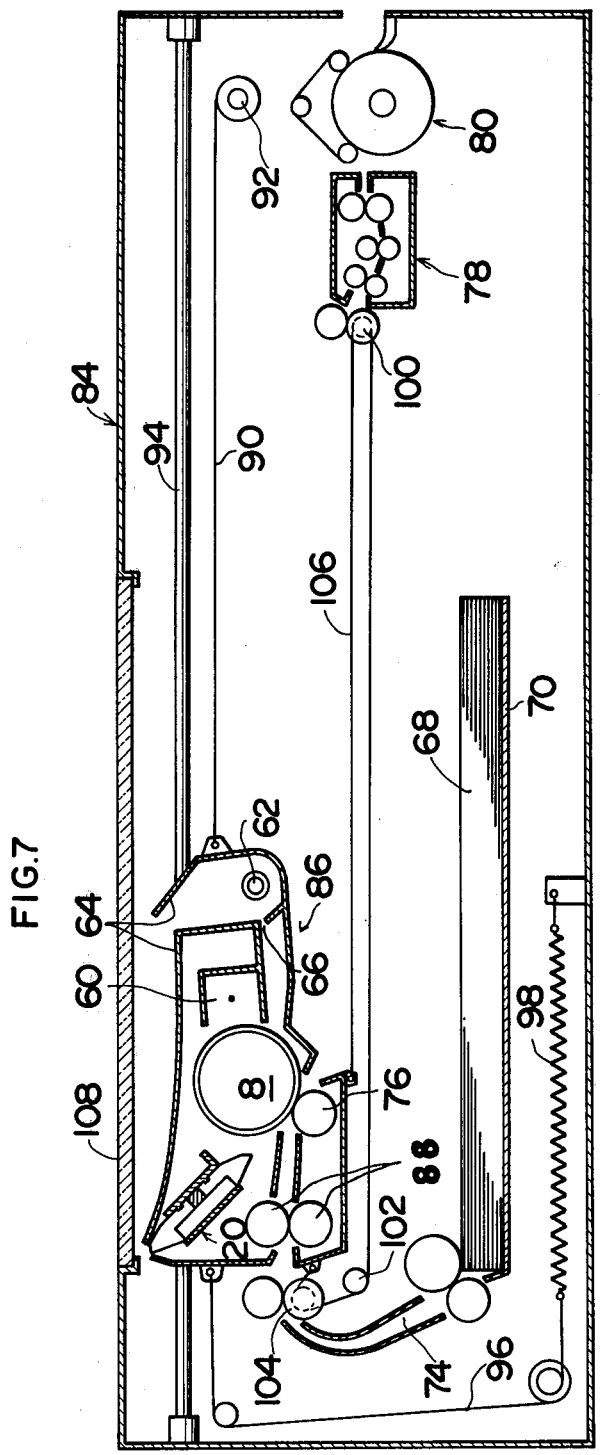
FIG. 7 is a cross-sectional view of a movable image-forming system, image transfer type, electrophotographic copying machine, to which the optical projection apparatus of the present invention is applied.

FIG. 7 shows another exemplary application of optical projection apparatus 20 of the present invention to a movable image-forming, image transfer type, electrophotographic copying machine 84, wherein the scanning casing in which the image forming system is housed is shifted for scanning the original document placed stationarily on the plate of transparent glass. The image forming system includes a photosensitive drum, optical projection and charger apparatus and an illumination light source and image transfer means.

This type of copying machine is suited for achieving a high-speed copying operation, because the transfer-sheet transporting speed is equal to the sum of the peripheral speed of the photosensitive drum and the shifting speed of the scanning casing. The conventional lens optical system, because of its large size and heavy weight, is not adaptable for a copying machine of that type. The fact that the image transmitter formed by a bundle of optical fibers having graded refractive indexes has been developed and adapted to the optical system in a copying machine has resulted in the copying machine shown in FIG. 7.

Referring to FIG. 7, scanning casing 86 includes therein photosensitive drum 8, optical projection apparatus 20 of the present invention, charger 60, lamp 62, reflecting mirror 74, opening 66, through which light from the lamp 62 is projected to the drum for erasing residual electrostatic charge thereon, a pair of transporting rollers 88, and transfer roller 76. Scanning casing 68 is shifted for scanning the original document placed on a plate of transparent glass 108 by take-up roller 92 around which is wound wire 90 connected at its one end to the front end of the scanning casing, and is carried by a pair of rails 94 attached to both side walls of the copying machine. Scanning casing 86 is returned to its home position by the force of spring 98 which is connected by wire 96 to the rear end of the scanning casing, as viewed in FIG. 7.

Transfer sheet 68 is fed from stacker 70, located in the lower portion of the copying machine, by transporting path 74, to the pair of transporting rollers 88 provided in scanning casing 86. Thus, with the shifting of the scanning casing, an electrostatic latent image is transferred onto the transfer sheet 68, and the image transferred thereon is transported to developing device 78. Transfer sheet 68, in this case, is transported to developing device 78 under the guidance of a plurality of wires 106 which are connected at one end to the lower portion of scanning casing 86, then around transporting roller 100 located at the entrance of developing device 78, roller 102 and transporting roller 104 disposed at the terminal of transporting path 74, and then connected at the other end to the rear end of the scanning casing. The plurality of wires 106 are arranged parallel to one another. It should be noted that the time at which the leading edge of the transfer sheet is fed between photosensitive drum 8 and transfer roller 76 is at the time of arrival of the leading edge of the electrostatic latent image to transfer roller 76. At the time of termination of the scanning, the trailing edge of the transfer sheet has passed through photosensitive drum 8 and transfer roller 76 completely. Thus, transfer sheet 68 having the electrostatic latent image transferred thereon is delivered, past developing device 78 and fixing device 80, to the exterior of the copying machine.

What is claimed is:

1. An optical projection apparatus for use in an image transfer type electrophotographic copier for projecting an optical image of an original document to a photosensitive drum comprising:
    an image transmitter formed by a bundle of optical fibers of graded refractive indexes disposed obliquely relative to the original document to be copied;
    two prism-shaped reflecting members respectively disposed in facing relation to each end of the image transmitter, each of said prism-shaped reflecting members including a prism portion and a support portion integrally formed therewith;
    means for supporting said image transmitter and the support portion of each said prism-shaped reflecting members fixed therebetween;
    the optical image of the original document being projected through said optical projection apparatus wherein the image is at first reflected through said prism-shaped reflecting member located on the original document side, and projected through the image transmitter and further reflected through the prism-shaped reflecting member located on the photosensitive drum side, whereby the image is projected onto the peripheral surface of the photosensitive drum at a point remote from the top portion of the photosensitive drum.

2. An optical projection apparatus as claimed in claim 1, wherein the image is projected onto the peripheral surface of the photosensitive drum at the area thereon closest to the image transfer portion.

3. An optical projection apparatus as claimed in claim 1, further comprising means for interrupting scattered rays in a space defined by the facing support portions of the two prism-shaped reflecting members.

4. An optical projection apparatus for use in an image transfer type electrophotographic copier for projecting an optical image of an original document to a photosensitive drum which comprises,
    an image transmitter formed by a bundle of optical fibers of graded refractive indexes disposed obliquely relative to the original document to be copied;
    two prism-shaped reflecting members respectively disposed in facing relation to each end of the image transmitter, wherein both said prism-shaped reflecting members include a prism portion and a support portion integrally formed therewith;
    two support plates for retaining said image transmitter and said two prism-shaped reflecting members integrally so as to retain the support portions of said two prism-shaped reflecting members and said image transmitter therebetween;
    the optical image of the original document being projected through said optical projection apparatus wherein the image is at first reflected through the prism-shaped reflecting member located on the original document side, and projected through the image transmitter and further reflected through the prism-shaped reflecting member located on the photosensitive drum side, whereby the image is projected onto the peripheral surface of said photosensitive drum at a point remote from the top portion thereof and closest towards the image transfer portion.

* * * * *